United States Patent Office 3,685,980
Patented Aug. 22, 1972

3,685,980
ALGICIDAL METHOD
Otto Scherer, Bad Soden, Taunus, and Hans Rochling, Konigstein, Taunus, Germany, assignors to Farbwerke Hoechst Aktiengesellschaft vormals Meister Lucius & Bruning, Frankfurt am Main, Germany
No Drawing. Filed Apr. 28, 1969, Ser. No. 819,981
Claims priority, application Germany, May 15, 1968,
P 17 68 447.8
Int. Cl. A01n 23/00
U.S. Cl. 71—67    7 Claims

ABSTRACT OF THE DISCLOSURE

A method of killing algae by adding to water containing said algae a naphthoquinone derivative of the general formula

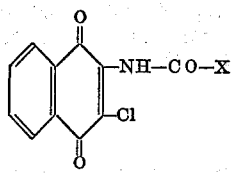

in which X stands for $CH_{(3-n)}Cl_n$, $CF_3$, or $CF_2 \cdot OCH_3$ ($n$ being 2 or 3).

---

The present invention relates to algicides containing as active ingredient naphthoquinone derivatives of the general formula

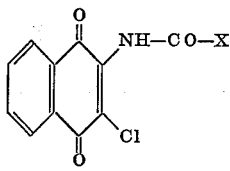

in which X stands for $CH_{(3-n)}Cl_n$, $CF_3$, or $CF_2 \cdot OCH_3$ ($n$ being 2 or 3).

It is known that 2,3-dichloro-1,4-naphthoquinone and 2-chloro-acetamido-3-chloro-1,4-naphthoquinone have algicidal properties.

Naphthoquinone derivatives of the formula

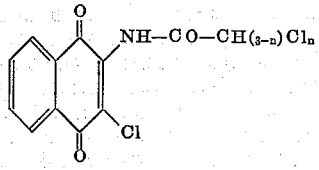

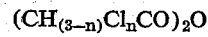

($n$ being 2 or 3).

are obtained by reacting 2-amino-3-chloro-1,4-naphthoquinone with
  (a) Acid anhydrides of the formula
$$(CH_{(3-n)}Cl_nCO)_2O$$
($n$ being 2 or 3) or
  (b) Acid halides of the formula $CH_{(3-n)}Cl_nCO$ hal ($n$ being 2 or 3) and hal being a halogen atom. The naphthoquinones are preferably reacted with the acid anhydrides suitably in the presence of 10 to 30 mole percent of the corresponding acid or p-toluene-sulfonic acid or a mineral acid such as sulfuric acid or hydrochloric acid.

For the reaction with acid halides there are preferably used 0.8 to 1.2 mole percent of a tertiary base such as triethyl amine as acid-binding substance.

As solvents there can be used all common solvents that are inert under the reaction conditions, such as benzene, toluene, xylene, chlorobenzene, cyclohexanone or ligroin. The reactions take place at a temperature in the range of from 25 to 140° C., preferably 100 to 140° C.

The compound of the formula

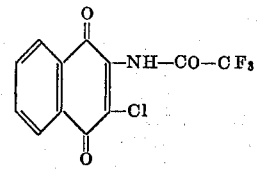

is known from J. Org. Chem. USSR, volume 1, No. 8, page 1479 (1965).

The compound of the formula

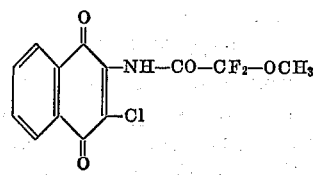

can be obtained by reacting 2-amino-3-chloro-1,4-naphthoquinone with methoxydifluoroacetyl fluoride $$(CH_3O—CF_2—COF)$$

The above compounds have an excellent effect against green algae of the types Chlorella as well as Spirogyra spp. and Vaucheria spp. The two latter types of algae grow, for example in wet rice fields and can effectively be combated by the compounds of the invention without the rice seedlings being damaged.

The toxicity for warm blooded animals ($LD_{50}$) of the compounds of the invention is low. It is 1327 mg./kg. of rat for 2-trichloroacetamido-3-chloro-1,4-naphthoquinone when administered orally, 15,000 mg./kg. of rat for 2-dichloroacetamino-3-chloro-1,4-naphthoquinone when administered orally. 2-trifluoroacetamido-3-chloro-1,4-naphthoquinone has a toxicity for warm-blooded animals of 350 mg./kg. of rat when administered orally and 400 mg./kg. of rabbit when administered dermally, and the $LD_{50}$ dose of 2-methoxy-difluoroacetamido-3-chloro-1,4-naphthoquinone is 2,502 mg./kg. of rat when administered orally.

The compounds of the invention are used in admixture with common solid or liquid inert carrier substances, adhesives, wetting agents, dispersing agents and/or grinding auxiliaries in the form of wettable powders, emulsions, spreading agents, suspensions, dusting powders or granules. They can be mixed with other insecticides, fungicides, nematocides or herbicides. Suitable carrier materials to produce the above preparations are mineral substances such as aluminum silicates, argillaceous earths, kaolin, chalks, siliceous chalks, talc, kieselguhr, or hydrated silicic acids, or preparations of the said mineral substances with special additives, for example chalk with sodium stearate, moreover all usual and suitable organic solvents, for example toluene, xylene, diacetone alcohol, gasolines, white mineral oils, dioxane, dimethyl formamide, dimethyl sulfoxide, ethyl acetate, butyl acetate, tetrahydrofurane and chlorobenzene.

Suitable adhesives are glutinous cellulose products or polyvinyl alcohols.

As wetting agents there can be used all suitable emulsifiers such as polyoxethylated alkyl phenols, salts of aryl or alkylaryl-sulfonic acids, salts of methyl taurine, salts of phenyl kogasin sulfonic acid, or soaps.

Dispersing agents that can be used are salts of sulfite waste liquors and salts of naphthalene-sulfonic acid, as well as hydrated silicic acids or kieselguhr.

Suitable grinding auxiliaries are organic or inorganic salts such as sodium sulfate, ammonium sulfate, sodium carbonate, sodium thiosulfate, sodium stearate or sodium acetate.

The following examples serve to illustrate the invention but they are not intended to limit it thereto.

EXAMPLE 1

2-dichloroacetamido-3-chloro-1,4-naphthoquinone 53.2 grams (0.22 mole) of dichloroacetic anhydride and 10 milliliters of dichloroacetic acid were added to a suspension of 41.5 grams (0.2 mole) of 2-amino-3-chloro-1,4-naphthoquinone in 150 milliliters of dried xylene and the mixture was heated for 90 minutes with reflux.

On cooling to room temperature, a solid separated which was filtered off, washed with cold xylene and dried. Yield 53 grams (83% of the theory); melting point 212–213° C.

Analysis.—Calcd. for $C_{12}H_6Cl_3NO_3$ (molecular weight 318.5) (percent): C, 45.2; H, 1.88; N, 4.4. Found (percent): C, 45.3; H, 1.9; N, 4.2.

EXAMPLE 2

2-trichloroacetamido-3-chloro-1,4-naphthoquinone 61.8 grams (0.2 mole) of trichloroacetic anhydride and 5 grams of trichloroacetic acid were added to a suspension of 27.7 grams (0.13 mole) of 2-amino-3-chloro-1,4-naphthoquinone in 100 milliliters of dried toluene and the mixture was heated for 90 minutes with reflux. The toluene was then distilled off under reduced pressure. After cooling 850 milliliters of methanol were poured over the residue, 10 grams of active carbon were added and the mixture was heated for 15 minutes with reflux. The mixture obtained was filtered, water was added until it became turbid and the mixture was allowed to stand for a while.

The precipitated solid was filtered off and dried. Yield 34.6 grams (71.5% of the theory); melting point 112° C.

Analysis.—Calcd. for $C_{12}H_5Cl_4NO_3$ (molecular weight 353) (percent): C, 40.8; H, 1.41; N, 3.9. Found (percent): C, 40.8; H, 1.3; N, 3.7.

EXAMPLE 3

2-methoxy-difluoroacetamide-3-chloro-1,4-naphthoquinone 20 milliliters of triethylamine and drop by drop at 25° C. whilst stirring a solution of 20.3 grams (0.159 mole) of methoxydifluoroacetyl fluoride in 150 milliliters of dried toluene of 5° C. were added to a suspension of 30.0 grams (0.145 mole) of 2-amino-3-chloro-1,4-naphthoquinone in 1,600 milliters of dried toluene. The reaction vessel was provided with an intensive cooler and a low temperature finger filled with isopropanol and Dry Ice. After the solution had been dropped in, the reaction mixture was slowly heated to 80° C. while stirring over a period of 210 minutes. The mixture was allowed to cool and the formed triethyl amine hydrofluoride was removed by filtration. The filtrate was concentrated and the crystals obtained were recrystallized from petroleum ether boiling in the range of from 80 to 110° C. Yield 27.9 grams (61% of the theory); melting point 126° C.

Analysis.—Calcd. for $C_{13}H_8ClF_2NO_4$ (molecular weight 315.5) (percent): C, 49.5; H, 2.54; N, 4.44. Found (percent): C, 49.7; H, 2.7; N, 4.4.

EXAMPLE 4

Green algae of the type Chlorella were cultivated in the laboratory in flasks having a capacity of 500 cc. at a water temperature of +24° C. in a nutrient solution while slowly passing through air and with continuous aeration. The algae cultures were treated with the following compounds:

2-dichloroacetamido-3-chloro-1,4-naphthoquinone (A)
2-trichloroacetamido-3-chloro-1,4-naphthoquinone (B)
2-trifluoroacetamido-3-chloro-1,4-naphthoquinone (E) and
2-methoxy-difluoroacetamide-3-chloro-1,4-naphthoquinone (F)

which were applied in the form of wettable powders of 25% strength suspended in water. The concentration of active ingredient in the nutrient medium was 5 p.p.m., 1.25 p.p.m. and 0.03 p.p.m., respectively (p.p.m.=parts by weight of active ingredient per 1 million parts of nutrient medium).

As comparative agents the following compounds were used:

2-chloroacetamido-3-chloro-1,4-naphthoquinone (C)
2,3-dichloro-1,4-naphthoquinone (D) and
triphenyltin acetate The tests lasted for 7 days. The effect of the algicides was evaluated by visual inspection. The results are summarized in Table 1. They show that the compounds of the invention A, B, E and F have a better algicidal effect than the comparative agent 2,3-dichloro-1,4-naphthoquinone (D) and an algicidal effect that comes near to that of triphenyltin acetate and 2-chloro-acetamido-3-chloro-1,4-naphthoquinone (C).

TABLE 1.—ALGICIDAL EFFECT AGAINST CHLORELLA IN PERCENT

|  | Concentration in p.p.m. | | |
| --- | --- | --- | --- |
|  | 5 | 1.25 | 0.03 |
| A | 100 | 99 | 10 |
| B | 100 | 70 | 0 |
| E | 100 | 100 | 46 |
| F | 100 | 100 | 55 |
| Comparative agent: |  |  |  |
| C | 100 | 100 | 0 |
| D | 80 | 10 | 0 |
| Triphenyltin acetate | 100 | 78 | 17 |
| Control | 0 | 0 | 0 |

EXAMPLE 5

In a greenhouse tests were carried out at +24° C. with rice (Oryza sativa) and green algae (Spirogyra supp. and Vaucheria supp.) in Kick-Brauckmann containers on sandy loam. After sowing of the rice the containers were filled with water until the water layer above the soil was 7 cm. high. The algae cultures were then introduced. The suspensions of the preparations in the form of wettable powders of 25% strength containing as active ingredient 2 - dichloroacetamido-3-chloro-1,4-naphthoquinone (A), 2 - trifluoroactamido-3-chloro-1,4 - naphthoquinone (E) and 2 - methoxy - difluoroacetamido-3-chloro-1,4 - naphthoquinone (F), respectively, were added when a closed layer of algae had formed and the rice seedlings had a height of 3 to 4 cm. on the average. The total depth of the water was 8 cm. The tested concentrations were 2.5 p.p.m., 1.25 p.p.m., and 0.06 p.p.m., respectively, calculated on the total amount of water in the container.

As comparative agents the following compounds were used:

2-chloroacetamido-3-chloro-1,4-naphthoquinone (C) and 2,3-dichloro-1,4-naphthoquinone (D)

The tests lasted for 6 weeks. The effect of the preparations on the algae and the rice was evaluated by visual inspection.

Substances A, E and F of the invention did almost no damage to the rice and had a better algicidal effect against Spriogyra and Vaucheria than comparative substances C and D. The results are summarized in the following Table 2.

TABLE 2

| | Concentration (p.p.m.) | | | | | |
|---|---|---|---|---|---|---|
| | 2.5 | 1.25 | 0.06 | 2.5 | 1.25 | 0.06 |
| | Algicidal effect in percent | | | Phytotoxicity in percent for rice | | |
| A | 100 | 70 | 10 | 0 | 0 | 0 |
| E | 100 | 80 | 20 | 0 | 0 | 0 |
| F | 100 | 95 | 45 | 10 | 0 | 0 |
| Comparative agent: | | | | | | |
| C | 90 | 60 | 10 | 10 | 0 | 0 |
| D | 10 | 8 | 0 | 0 | 0 | 0 |
| Control | 0 | 0 | 0 | 0 | 0 | 0 |

What is claimed is:

1. A method of killing algae which comprises adding to water containing said algae an algicidal compound of the formula

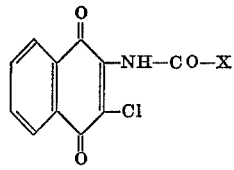

in which X stands for $CH_{(3-n)}Cl_n$, $CF_3$ or $CF_2OCH_3$ and $n$ is 2 or 3 in an amount to give an algicidally effective concentration of up to about five parts per million parts of said water.

2. The method of claim 1 wherein the algicidal compound is added to said water in an amount to give a concentration of from about 1.25 to about 5 parts per million parts of said water.

3. The method defined in claim 1 wherein the algicidal compound is a compound selected from the group consisting of 2-dichloroacetamido-3-chloro - 1,4 - naphthoquinone, 2 - trichloroacetamido - 3 - chloro - 1,4 - naphthoquinone and 2-methoxydifluoroacetamido - 3 - chloro-1,4-naphthoquinone.

4. The method defined in claim 1 wherein the algicidal compound is 2-dichloroacetamido-3-chloro-1,4 - naphthoquinone.

5. The method defined in claim 1 wherein the algicidal compound is 3-trichloroacetamido-3-chloro-1,4 - naphthoquinone.

6. The method defined in claim 1 wherein the algicidal compound is 2-methoxy-difluoroacetamido-3-chloro - 1,4-naphthoquinone.

7. The method defined in claim 1 wherein the algicidal compound is 2-trifluoroacetamido-3-chloro-1,4 - naphthoquinone.

References Cited
UNITED STATES PATENTS 2,999,810  9/1961  Sundholm et al. _____ 71—67
3,481,730  12/1969  Duros, Jr., et al. _____ 71—67

JAMES O. THOMAS, JR., Primary Examiner

U.S. Cl. X.R.

260—396 R

UNITED STATES PATENT OFFICE
CERTIFICATE OF CORRECTION

Patent No. 3,685,980          Dated August 22, 1972

Inventor(s) Otto Scherer and Hans Rochling

It is certified that error appears in the above-identified patent and that said Letters Patent are hereby corrected as shown below:

In the Heading, after "claims priority" change "application" to --applications-- and after "P 17 68 447.8" insert --and P 17 67 486.1, and December 2, 1968, P 18 12 140.9--.

Signed and sealed this 9th day of January 1973.

(SEAL)
Attest:

EDWARD M. FLETCHER, JR.          ROBERT GOTTSCHALK
Attesting Officer                Commissioner of Patents